R. B. HINTON & O. KORT.
TROLLEY.
APPLICATION FILED APR. 28, 1914.
1,122,927.
Patented Dec. 29, 1914.
2 SHEETS—SHEET 1.
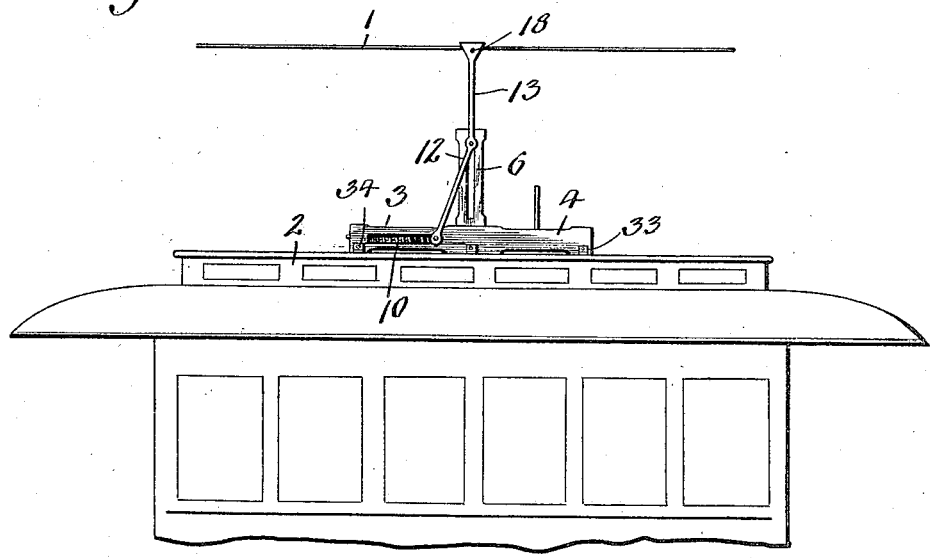
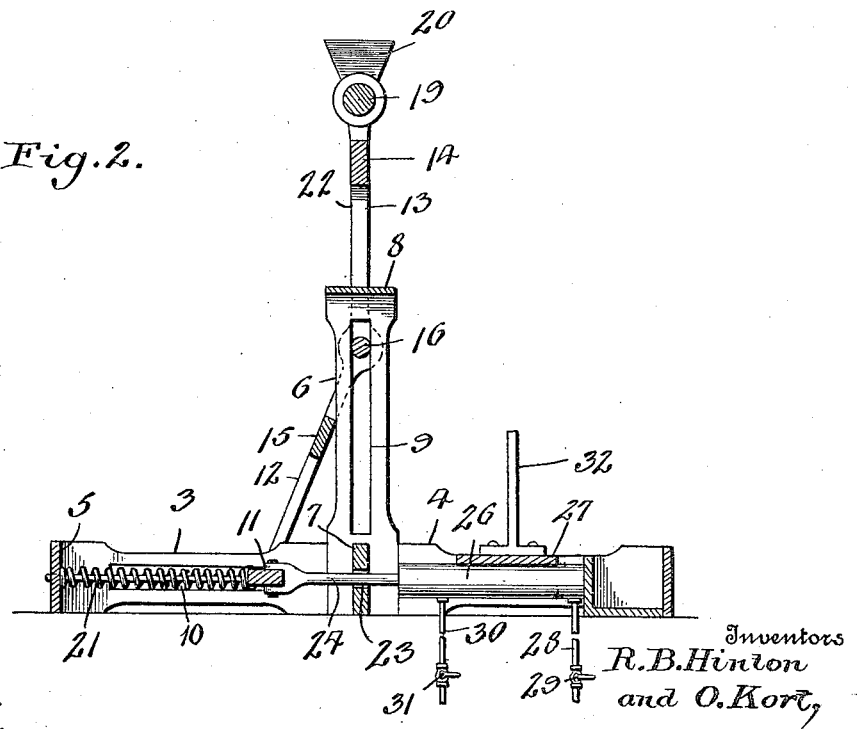
Witnesses
Inventors
R. B. Hinton
and O. Kort,
By Victor J. Evans
Attorney

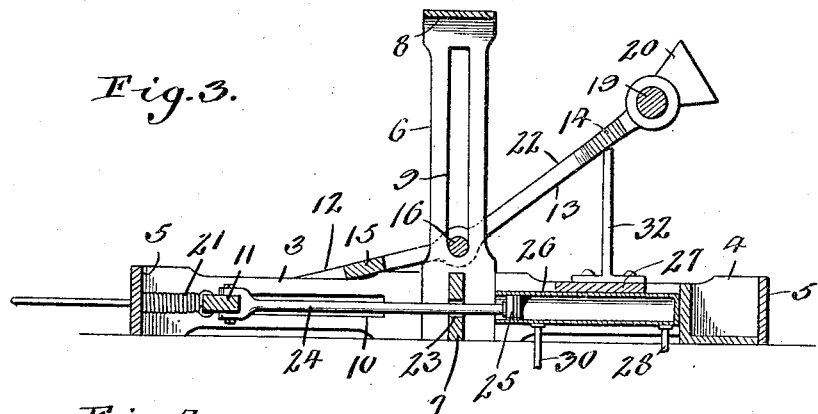
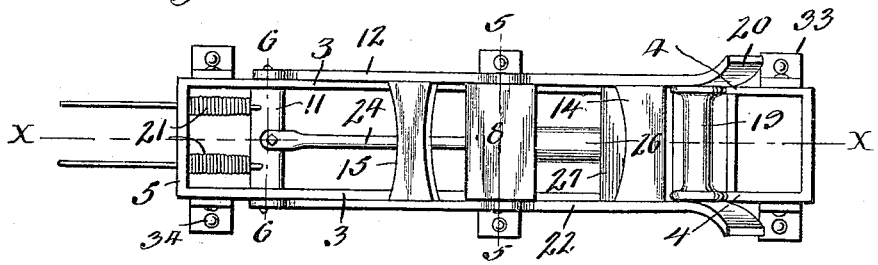
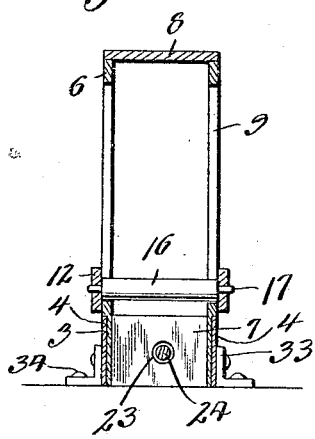
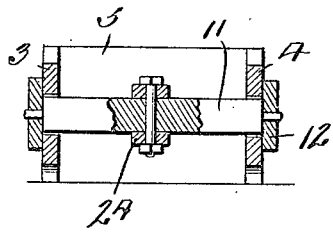

UNITED STATES PATENT OFFICE.

ROGER BELL HINTON AND OSCAR KORT, OF LOS ANGELES, CALIFORNIA.

TROLLEY.

1,122,927.  Specification of Letters Patent.  Patented Dec. 29, 1914.

Application filed April 28, 1914. Serial No. 835,022.

*To all whom it may concern:*

Be it known that we, ROGER B. HINTON and OSCAR KORT, citizens of the United States, residing at Los Angeles, in the county of Los Angeles and State of California, have invented new and useful Improvements in Trolleys, of which the following is a specification.

The present invention relates to improvements in trolleys for vehicles deriving propelling power from overhead conductors.

In carrying out our invention we propose to provide a trolley which shall include a comparatively long roller in lieu of a grooved wheel and to provide the arms of the device with guard fingers arranged on the opposite sides of the roller, so that the liability of the conductor wire moving off of the roller in a transverse direction will be reduced, if not entirely overcome.

We also propose to provide a trolley which shall under all conditions be forced into engagement with the conductor wire, the said engagement being sufficient to provide for all irregularities or curves in the wire, but which may be easily and quickly lowered from such engagement when desired.

With the above objects in view, and others which will appear as the nature of the invention is more fully understood, the improvement resides in the construction, combination and arrangement of parts set forth in the following specification and falling within the scope of the appended claims.

The essential features of the invention involved in carrying out the objects above indicated, are necessarily susceptible of embodiment in various forms of construction without departing from the scope of the invention, but certain preferred and practical embodiments are exemplified by the accompanying drawings, in which:—

Figure 1 is a side elevation of a car provided with our improved trolley, the same engaging with an overhead wire conductor. Fig. 2 is a central vertical longitudinal sectional view through the same, Fig. 3 is a section with the trolley lowered and approximately on the line x—x of Fig. 4. Fig. 4 is a plan view of the device with the trolley in its lowered position, Fig. 5 is a transverse sectional view approximately on the line 5—5 of Fig. 4, and Fig. 6 is a sectional view on the line 6—6 of Fig. 4.

Referring now to the drawings in detail, 1 designates an overhead conducting wire, 2 a car or like vehicle arranged to travel upon a track below the wire 1, and 3 our improved trolley in its entirety. The trolley 3 includes a base frame in the nature of an elongated rectangular member which is arranged longitudinally and centrally upon the top of the car or vehicle 2. The frame includes a pair of side members 4 having end connecting members 5.

Disposed centrally between the sides 4 of the frame and connected thereto is a pair of vertically arranged uprights 6. These uprights are provided, at their lower ends, with a transverse spacing member or brace 7, while secured to the upper edges of the uprights is a spacing and bracing member in the nature of a platform 8. The uprights 6 are disposed opposite each other, as stated, and each of said arms is centrally slotted, as at 9, the said slots extending nearly the entire length of the uprights.

The side members 4 of the frame between the arms 6 and one of the ends 5 of the frame are provided with elongated longitudinally extending slots 10 and arranged for longitudinal movement within the said slots 10 is a cross head 11. The cross head comprises a substantially rectangular member and has its ends projecting through the slots, while pivotally connected with the said ends are the arms or sides 12 of the conductor 13.

The arms or sides 12 are provided with transverse webs or connecting members 14 and 15 respectively, the web 14 being disposed adjacent the free ends of the arms, the second web 15 being arranged a suitable distance from the pivoted ends of the sides or arms 12, and above the frame of the device.

The numeral 16 designates an anti-frictional roller which has its ends provided with trunnions or short axles 17, the same finding bearings in openings in the arms or sides 12, and the said roller is arranged within the slots 9 of the arms, and is adapted to engage with the walls provided by the said slots. The roller 16 is arranged approximately centrally of the conductor 13, and the outer or free ends of the arms or sides 12 are provided with registering openings which form journals for the trunnions or short axles 18 of a conductor roller 19. The ends of the arms 12 are further provided with outwardly extending upwardly flared directing flanges 20 which are adapted to serve as means to assist in preventing the wire 1 moving laterally from off of the conductor roller 19. It should here be stated that the roller 19 is of a comparatively great length, so that the car will be permitted to round curves or to engage with laterally extending bent or extending portions of the wire 1 without danger of the said wire leaving the roller 19, and as a matter of fact the conductor 13 is, in practice, of a width approximately equaling one-half of the width of the car upon which it is arranged.

Secured upon the cross head 11 and also connected to the end 5 of the frame, opposite the said cross head, is a pair of pressure springs 21, the said springs being of sufficient strength to move the conductor to bring its antifrictional roller 16 to the top wall provided by the slots 9 in the uprights 6.

The arms or sides 12 of the conductor 13 are formed with angular extensions 22 and it is upon the ends of these extensions that the flanges 20 are formed, and also the conductor roller 19 is journaled in suitable bearings provided in the said angular portions 22 of the arms of the said conductor 13. By this arrangement the portions 22 of the conductor are arranged centrally and in a line with the vertical uprights 6 when the conductor is moved to its opposite position by the springs 21.

Centrally connected with the cross head 11 and extending longitudinally of the frame and finding a bearing in an opening 23 in the brace 7 of the upright 6, is a piston rod 24, the said rod having its free end provided with a piston head 25 that works in a cylinder 26, the said cylinder being secured between the side members of the frame upon a transversely arranged block or support 27, and connected with the cylinder, at the closed end thereof, is an air pipe 28, the same being connected with the air storage tank for the brakes of the car (not shown).

The pipe 28 is provided with an operating valve 29, and it will be apparent that when a fluid is admitted through the cylinder to the pipe through the back of the piston head 25, the piston rod 24 will be moved to compress the springs 21, and so lower the trolley or conductor 13.

The numeral 30 designates the outlet pipe for the fluid which is connected with the cylinder and which is provided with a valve 31, which arrangement permits of a certain amount of fluid remaining in the cylinder to serve as a cushion for the piston head and for adjusting the tension of the springs 21.

It is, of course, to be understood that the springs 21 will permit of a rocking or swinging movement of the trolley or conductor when the same contacts with an obstacle in the trolley wire 1, so the trolley is at all times sustained in a yieldable condition, and in order to support the trolley when the same is lowered as well as to limit the movement of the said trolley in such a direction, we provide a vertically projecting member 32 which is arranged to contact with the upper web 14 between the sides or arms 12 of the conductor and so support the same when lowered.

In order to provide means whereby the frame may be easily and quickly secured upon an ordinary trolley car, we provide the side members 4 of the said frame, adjacent the ends 5 thereof, and at a point approximately central of the said sides, with brackets 33, the said brackets being in the form of right angular members, the vertical portions of which are secured to the sides and the horizontal portions are provided with openings for the reception of securing bolts 34.

It should be stated that the air pipes are so arranged as to have their valves within close proximity to the motorman or conductor, and also that the wiring from the conductor to the motor of the car may be arranged in any manner best suited, and so such an arrangement has not been deemed necessary to illustrate.

From the above description taken in connection with the drawings, the advantages and method of operation will, it is thought, be apparent to those skilled in the art to which such invention appertains without further detailed description.

Having thus described the invention, what we claim is:

1. A trolley including a horizontally disposed frame having longitudinal slots, slotted uprights disposed centrally of the frame, arms arranged on the opposite sides of the frame and uprights, members connected with the arms and arranged for movement within the slots, a conductor roller carried by the arms and arranged at the outer ends thereof, and spring means for moving the lower connecting member of the arms for sustaining the said arms vertical.

2. A trolley including a horizontally disposed frame having sides, slotted uprights arranged centrally of the frame, angular arms disposed upon the opposite sides of the frame and uprights, a roller passing through the slots in the uprights and connected with the arms at the juncture of the angular portions thereof, a conductor roller journaled in the free ends of the arms, a lower connecting member for the arms passing through elongated slots in the frame, and spring means arranged between the frame and the said lower connecting member of the arms for moving the arms upon the frame to normally sustain the free end of the arms vertically with respect to the uprights.

3. A device for the purpose set forth including a frame having its sides slotted, slotted uprights disposed centrally of the frame and connected to the sides thereof, a trolley comprising a pair of spaced arms arranged on the outer sides of the frame and uprights, a cross head arranged within the slots of the frame and connected with the lower ends of the arms of the trolley, a roller arranged within the slots of the uprights and journaled within the said arms, a conductor roller journaled in the outer ends of the arms, said ends of the arms having outwardly flared guide flanges, and springs between the cross head and one of the ends of the frame for sustaining the trolley at an angle to the frame and vertical.

4. A trolley including a horizontally disposed frame having longitudinal slots, slotted uprights disposed centrally of the frame, arms disposed on the opposite sides of the frame and uprights, members loosely connected with the arms and arranged within the slots, a conductor roller carried by the arms, spring means for normally forcing the lower ends of the arms toward the uprights, means for swinging the arms to bring the roller below the top of the uprights, and a rest for the arms.

5. A trolley including a horizontally disposed frame having longitudinal slots, slotted uprights disposed centrally of the frame, arms disposed on the opposite sides of the frame and uprights, members arranged within the slots and journaled within the arms, a conductor roller carried by the arms and arranged at the free ends thereof, spring means for sliding the arms upon the frame to elevate the conducting roller, and fluid means for moving the arms to lower the roller.

6. In a device for the purpose set forth, a rectangular frame having its sides provided with registering slots, slotted uprights disposed centrally of the frame and adjacent the slots in the sides of the frame, a trolley including two spaced arms arranged upon the opposite sides of the frame and uprights, connecting members for the arms arranged within the slots and journaled upon the arms, a conductor roller journaled on the outer ends of the arms, spring means between one of the ends of the frame and the lower connecting member of the arms for moving the arms toward the uprights to elevate the trolley, a piston rod upon the connecting member of the arms which is arranged in the slots of the frame, an air cylinder receiving the head of the piston, a valved inlet pipe for the cylinder, and a valved outlet pipe for the said cylinder.

In testimony whereof we affix our signatures in presence of two witnesses.

ROGER BELL HINTON.
OSCAR KORT.

Witnesses:
E. A. WICKERSHAM,
L. E. LAMPTON.

Copies of this patent may be obtained for five cents each, by addressing the "Commissioner of Patents, Washington, D. C."